(12) United States Patent
Cyr

(10) Patent No.: US 6,908,193 B2
(45) Date of Patent: Jun. 21, 2005

(54) EYEWEAR

(75) Inventor: Raymond Cyr, Laval (CA)

(73) Assignee: Cabot Safety Intermediate Corporation, Newark, DE (US)

( * ) Notice: Subject to any disclaimer, the term of this patent is extended or adjusted under 35 U.S.C. 154(b) by 0 days.

(21) Appl. No.: 10/648,750

(22) Filed: Aug. 25, 2003

(65) Prior Publication Data

US 2004/0141147 A1 Jul. 22, 2004

Related U.S. Application Data

(63) Continuation of application No. PCT/US02/05683, filed on Feb. 25, 2002.

(30) Foreign Application Priority Data

Feb. 23, 2001 (CA) .............................................. 2337731

(51) Int. Cl.⁷ ................................................. G02C 1/04
(52) U.S. Cl. ........................................ 351/103; 351/105
(58) Field of Search .......................... 351/41, 103–109, 351/124–129, 133–135, 154

(56) References Cited

U.S. PATENT DOCUMENTS

| 5,619,287 | A | * | 4/1997 | Tseng ........................... 351/44 |
| 5,903,331 | A | * | 5/1999 | Lin ............................. 351/105 |
| 6,132,041 | A | * | 10/2000 | Lin ............................. 351/105 |
| 6,386,704 | B1 | * | 5/2002 | Wu .............................. 351/106 |

* cited by examiner

*Primary Examiner*—Huy Mai
(74) *Attorney, Agent, or Firm*—Cantor Colburn LLP

(57) ABSTRACT

The eyewear described comprises a unitary lens consisting of a pair of transparent sight regions and of a bridging region therebetween and a lens engaging brow frame engaging the upper edge of the lens and having its opposite ends extending through openings provided at the opposite upper ends of the sight regions. Parts of the frame and of the lens cooperate to mount the brow frame to the lens. A nose piece engages the frame and the lens to secure the assembly together.

15 Claims, 5 Drawing Sheets

EYEWEAR

CROSS REFERENCE TO RELATED APPLICATIONS

The present application claims priority to and is a continuation International Patent Application No. PCT/US02/05683, filed Feb. 25, 2002, the entire contents of which are specifically incorporated herein by reference, which claims priority to Canadian Patent Application No. 2,337,731, filed Feb. 23, 2001, the entire contents of which are specifically incorporated herein by reference.

BACKGROUND

It is not at all unusual for a lens and/or an ear stem of protective eyewear to break during industrial use. Such occurrences of breakage generally require that a user discard the entire eyewear and replace it with a new pair.

The industry also lacks a protective eyewear selection that can comfortably accommodate different sizes. This lack of comfort and adjustability is particularly felt when workers must wear such protective eyewear during long hours of industrial work. There is therefore a need in the art for eyewear that solves the problems attendant to breakage of the eyewear. At the same time, there is a need for eyewear that provides comfort to the wearer during hours of industrial use.

One eyewear, described in U.S. Pat. No. 5,987,653 issued Nov. 23, 1999 to the present assignee, illustrates an eyewear for industrial use that comprises a deformable arcuate lens with a pair of temple entries at opposite ends thereof and a deformable brow frame shaped to fit the upper edge of the lens so as to be engageable therewith. The assembly of the temple pieces and the brow frame to the lens is effected by inserting the temple pieces through the entries of the lens and by effecting a snap engagement of the mid section of the brow frame to the upper edge of the lens. While this reference teaches one type of modular eyewear, there is room for improvement.

SUMMARY

The above-described and other problems and disadvantages of the prior art are overcome and alleviated by the present eyewear, wherein the components can be readily mounted and dismounted. This is achieved, in one exemplary embodiment, by providing a nose piece with a securing mechanism, wherein the nosepiece secures the assembly of the brow frame to the lens.

According to one exemplary embodiment, the present eyewear comprises a unitary lens comprising a bridging region between sight regions, a pair of openings provided at distal upper ends of the lens; a brow frame engaging at least a portion of an upper edge of the lens, the brow frame having opposite ends extending through the openings; and a detachable nose piece having at least one portion configured to engage the frame and the bridging region of the lens.

According to another exemplary embodiment, the present eyewear comprises a unitary lens consisting of a pair of transparent sight regions and a bridging region between the sight regions; the lens displaying an upper edge extending along the sight and bridging regions, a lower edge extending along the sight and bridging regions and a pair of openings respectively provided at a distal upper end of the sight regions; a brow frame engaging the upper edge of the lens and opposite ends extending through the openings; means on the brow frame and on the upper edge of the lens cooperating to mount the frame to the upper edge of the lens; a detachable nose piece having first means to engage the frame and the nose portion and second means to engage the lower edge of the bridging region and parts of the sight portions to secure assembly of the brow frame to the lens; and a pair of ear stems mounted at respective opposite ends of the brow frame and rearwardly of the openings so as to be able to pivot between an inwardly folded positive to an outwardly ear contacting position.

In another exemplary embodiment, the upper edge of the lens includes recesses in the sight regions and the brow frame comprises hook means engaging these recesses.

In another exemplary embodiment, the nose piece has a groove which is adapted to receive therein the lower edge of the bridging region and some parts of the sight regions.

Other objects and further scope of applicability of the present invention will become apparent from the detailed description given hereinafter. It should be understand, however, that this detailed description, while indicating exemplary embodiments of this invention, is given by way of illustration only since various changes and modifications within the spirit and scope of the invention will become apparent to those skilled in the art.

BRIEF DESCRIPTION OF THE DRAWINGS

Referring now to the drawings, wherein like elements are numbered alike in the FIGURES.

DESCRIPTION OF EXEMPLARY EMBODIMENTS

Reference will now be made in detail to exemplary embodiments of heat management systems, examples of which are illustrated in the accompanying FIGURES.

Figure 1:
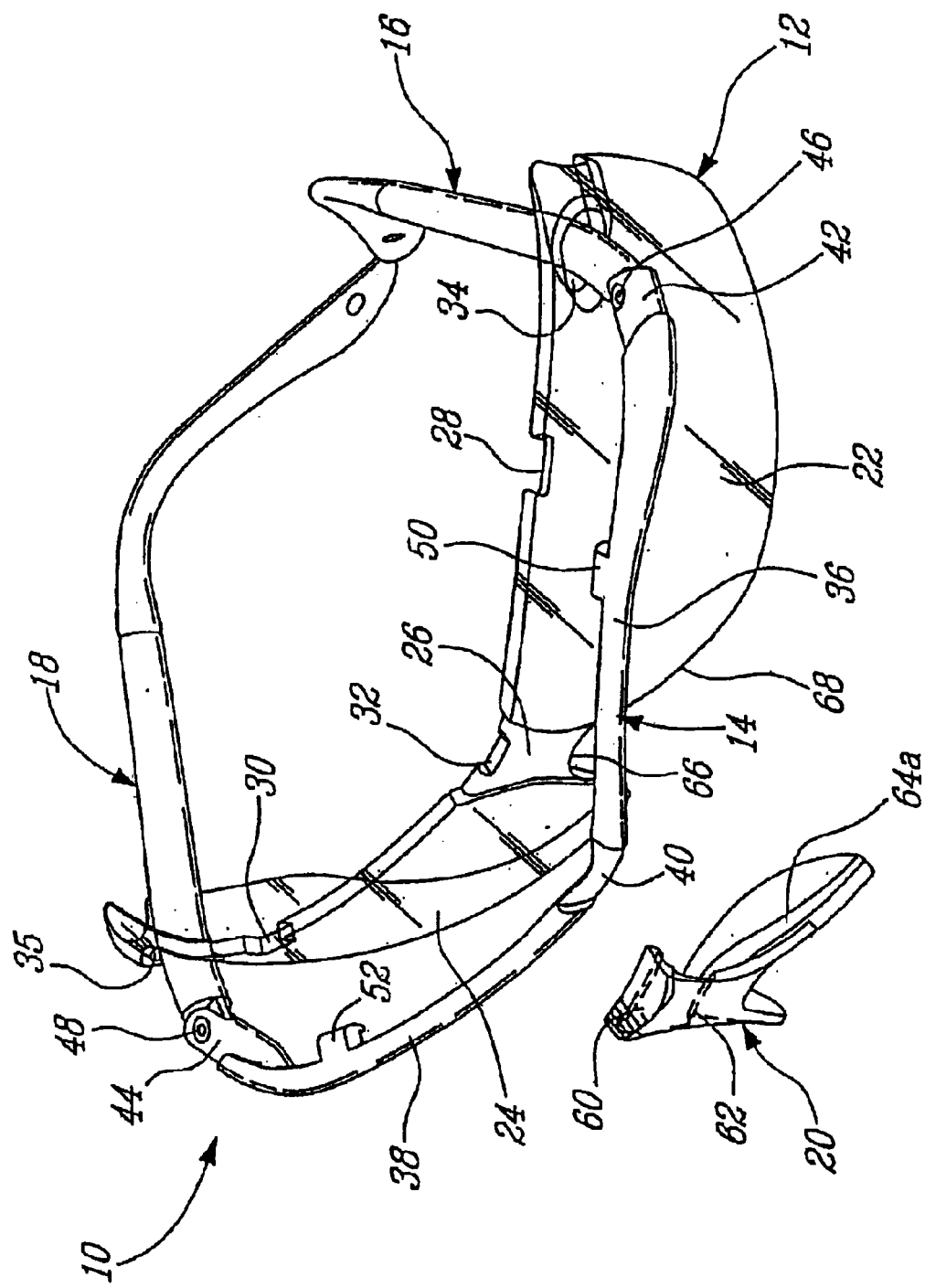
FIG. 1 is an exploded perspective view of an eyewear made in accordance with the present invention.

Referring to FIG. 1, there is shown an exemplary eyewear, generally designated 10, comprising five components, namely, a lens 12, a brow frame 14, a pair of ear stems 16 and 18, and a nose piece 20.

Figure 2:
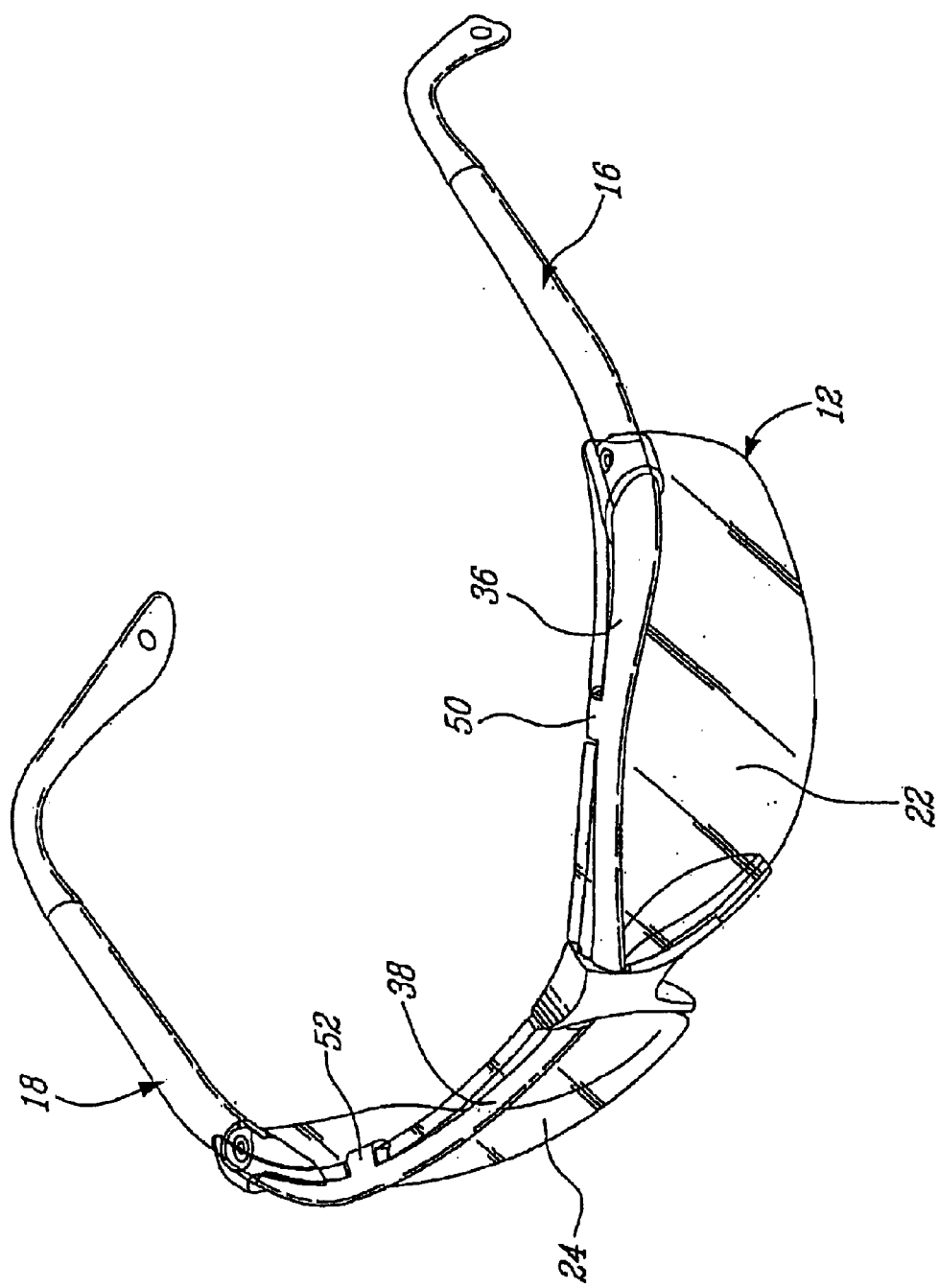
FIG. 2 is a top perspective view of the eyewear components assembled.
Figure 3:
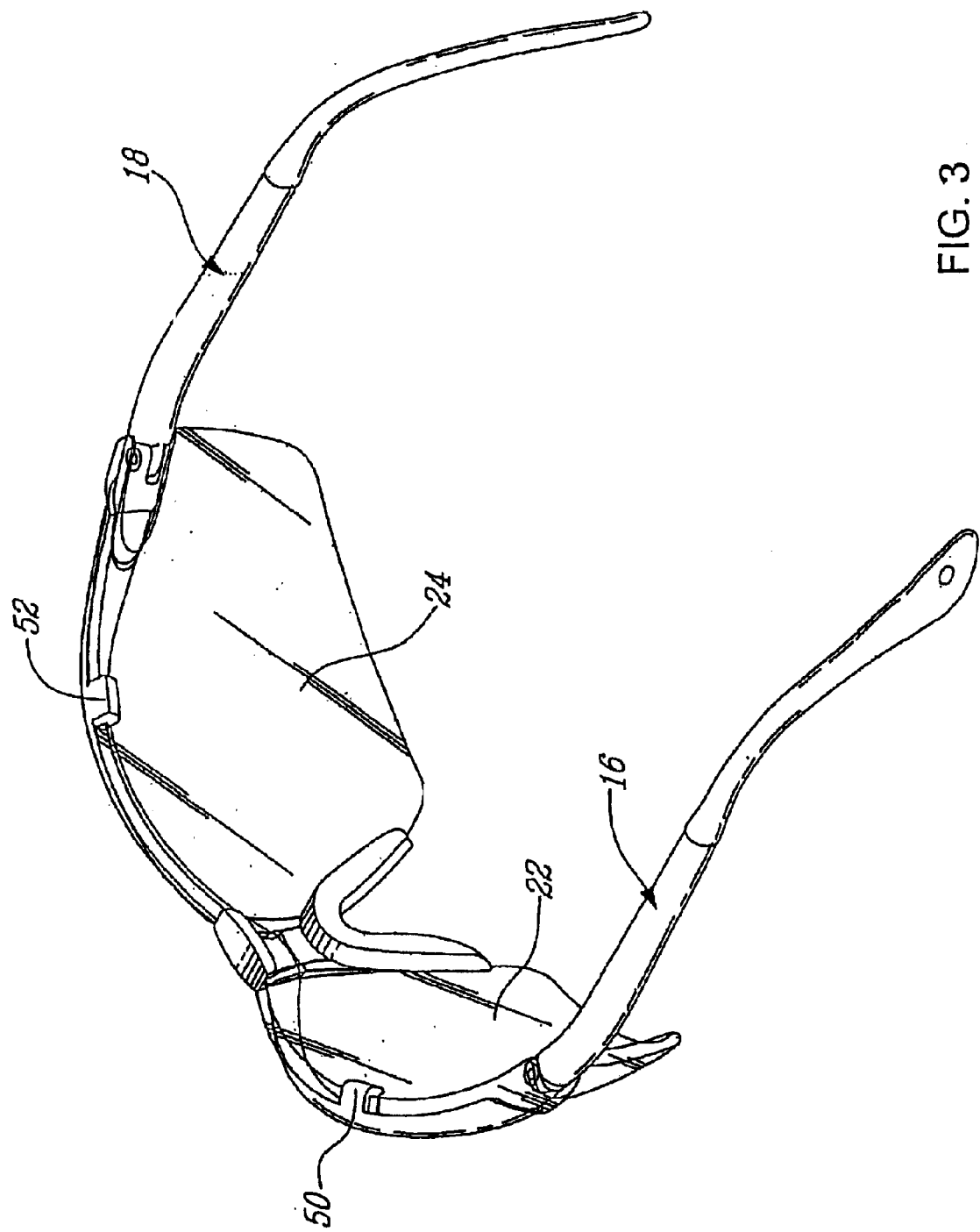
FIG. 3 is a rear perspective view of the eyewear.
Figure 4:
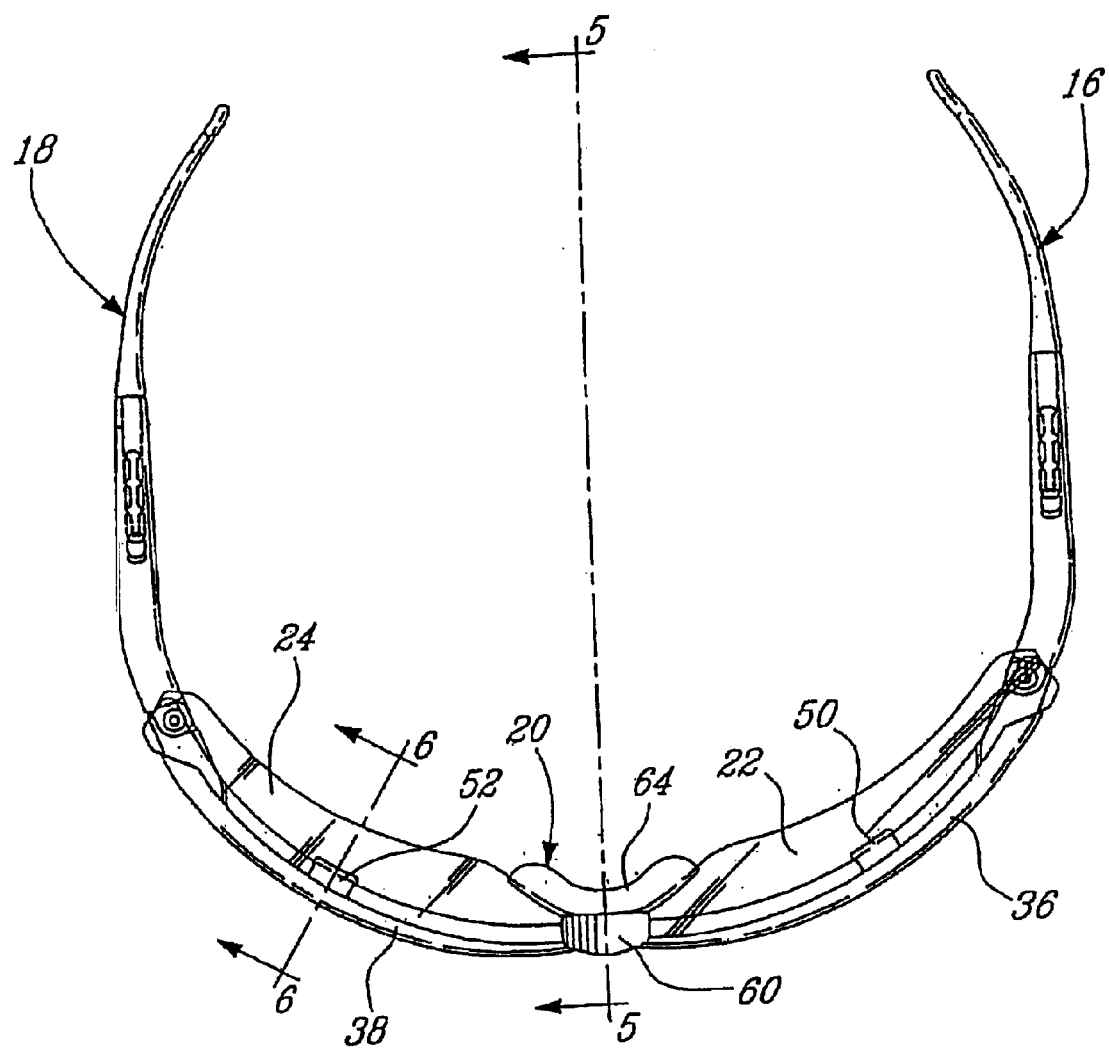
FIG. 4 is a top view of the eyewear.

Referring also to FIG. 2, which shows the components in assembled form, the lens 12 includes a pair of transparent sight regions 22 and 24, at least a portion of which are of transparent material, and a central bridging region 26 which may or may not be transparent. In one exemplary embodiment, the lens 12 is an arcuate lens.

In the illustrated embodiment, the upper edge of each sight region 22, 24 includes recesses 28, 30. The illustrated exemplary bridging region 26 includes a recessed area 32. The upper distal end portion of each sight region 22, 24 also includes openings 34, 35.

The illustrated exemplary brow frame 14 comprises two sections, 36 and 38, which are adapted to lie along the upper edge of the lens. The brow frame includes a recessed area 40 which is in registry with the bridging region 26 of the lens. The opposite ends 42 and 44 are dimensioned such that they may extend through the respective openings 34, 35. In the illustrated, exemplary embodiment, pivot pins 46 and 48, which connect ear stems 16, 18 to the brow frame 14 are located rearwardly of the lens 12 when the brow frame is mounted to the lens.

Figures 5, 6:
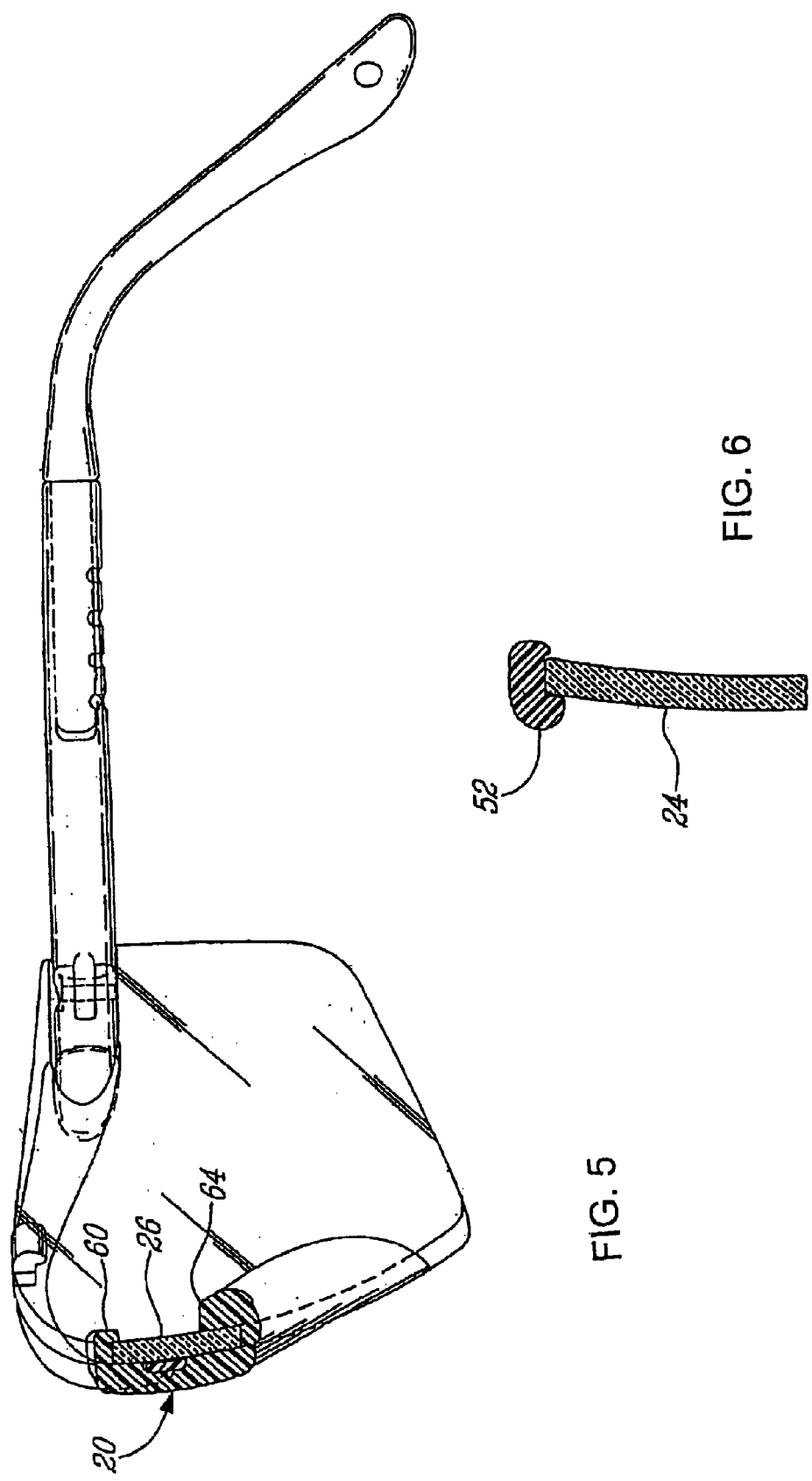
FIG. 5 is a cross-sectional view taken along lines 5—5 of FIG. 4.
FIG. 6 is a cross-sectional view taken along lines 6—6 of FIG. 4.

The exemplary brow frame 14 further includes a pair of rearwardly extending projections 50 and 52 (illustrated as hooks), which have a width slightly less than the width of corresponding recesses 28 and 30 of the lens (see FIG. 6).

The exemplary ear stems 16 and 18 are pivotly connected at 46 and 48 to the respective ends of 42 and 44 of the brow frame to move between an inwardly folded position and a rearwardly extending ear contacting position.

The exemplary nose piece 20 has at it upper edge, an extension 60 (illustrated as a hook) having a width adapted to be positioned over area 32 of the bridging region 26. The central region 62 of the nose piece has a flat rear surface which is adapted to contact the flat surface area 40 of the brow frame 14. The exemplary nose piece also includes a narrow vertical curved rear wall 64 which, together with the rear face of the central region 62 defines a recess in which the lower edge 66 of the bridging region 26 may sit. This rear wall 64 downwardly extends along opposite sides (one of which is shown as 64a) so as to further serve as a backing against which may bear part of the lower edge 68 of the sight region 22 as well as part of the lower edge of the sight region 24.

While the invention has been described with reference to an exemplary embodiment, it will be understood by those skilled in the art that various changes may be made and equivalents may be substituted for elements thereof without departing from the spirit or scope of the invention. In addition, many modifications may be made to adapt a particular situation or material to the teachings of the invention without departing from the essential scope thereof. Therefore, it is intended that the invention not be limited to the particular embodiment disclosed as a best mode contemplated for carrying out the invention, but that the invention will include all embodiments falling within the scope of the appended claims.

What is claimed is:

1. Eyewear comprising:

a unitary lens comprising a pair of transparent sight regions, a nose portion and a bridging region between said sight regions; said lens displaying an upper edge extending along said sight and bridging regions, a lower edge extending along said sight and bridging regions and a pair of openings respectively provided at a distal upper end of said sight regions;

a brow frame engaging said upper edge of said lens and opposite ends extending through said opening;

a detachable nose piece engaging said frame and said nose portion and engaging said lower edge of said bridging region and parts of said sight portions to secure assembly of said brow frame to said lens; and a pair of ear stems mounted at respective opposite ends of said brow frame and rearwardly of said openings.

2. Eyewear as defined in claim 1, wherein said upper edge of said lens includes recesses in said sight regions and wherein said brow frame comprises hook means engaging in said recesses.

3. Eyewear as defined in claim 1, wherein said upper edge of said lens comprises a recessed area over said bridge region and wherein said nose piece comprises a hook portion engaging said recessed area.

4. Eyewear as defined in claim 3, wherein said nose piece includes a groove adapted to receive the lower edge of said bridging region and said parts of said sight regions therein.

5. Eyewear comprising:

a unitary lens comprising a pair of transparent sight regions and a bridging region between said sight regions; said lens displaying an upper edge extending along said sight and bridging regions, a lower edge extending along said sight and bridging regions and a pair of openings respectively provided at a distal upper end of said sight regions;

a brow frame engaging said upper edge of said lens and opposite ends extending through said openings;

a detachable nose piece engaging said frame, said lower edge of said bridging region and parts of said sight portions; and a pair of ear stems mounted at respective opposite ends of said brow frame.

6. Eyewear as defined in claim 5, wherein the unitary lens is an arcuate lens.

7. Eyewear, comprising:

a lens comprising a bridging region between sight regions, a pair of openings provided at distal upper ends of the lens;

a brow frame engaging at least a portion of an upper edge of the lens, the brow frame having opposite ends extending through the openings; and a detachable nose piece having at least one portion configured to engage the frame and the bridging region of the lens.

8. The eyewear in accordance with claim 7, wherein at least a portion of said sight regions is transparent.

9. The eyewear in accordance with claim 7, wherein the lens is unitary.

10. The eyewear in accordance with claim 7, wherein the lens is arcuate.

11. The eyewear in accordance with claim 7, further comprising means on the brow frame and on the upper edge of the lens to mount the frame to the upper edge of the lens.

12. The eyewear in accordance with claim 7, further comprising at least one projection on at least one of the frame and the lens, the projection configured to engage at least one recess on the other of the frame and the lens to mount the frame to the upper edge of the lens.

13. The eyewear in accordance with claim 12, wherein the projection is configured as a hook.

14. The eyewear in accordance with claim 12, wherein the at least one projection is provided on the frame, and wherein the at least one projection is configured to engage a corresponding recess on the lens.

15. The eyewear in accordance with claim 7, wherein said nose piece includes a groove adapted to receive the lower edge of said bridging region.

* * * * *